United States Patent
Ducote et al.

(10) Patent No.: US 11,430,199 B2
(45) Date of Patent: Aug. 30, 2022

(54) FEATURE RECOGNITION ASSISTED SUPER-RESOLUTION METHOD

(71) Applicant: Google LLC, Mountain View, CA (US)

(72) Inventors: Christopher Ducote, San Jose, CA (US); Ian Muldoon, Redwood City, CA (US); Romain Clement, Campbell, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/467,285

(22) PCT Filed: Dec. 9, 2016

(86) PCT No.: PCT/US2016/065909
§ 371 (c)(1),
(2) Date: Jun. 6, 2019

(87) PCT Pub. No.: WO2018/106262
PCT Pub. Date: Jun. 14, 2018

(65) Prior Publication Data
US 2019/0311209 A1    Oct. 10, 2019

(51) Int. Cl.
*G06V 10/22* (2022.01)
*G06T 7/292* (2017.01)
(Continued)

(52) U.S. Cl.
CPC .............. *G06V 10/22* (2022.01); *G06K 9/623* (2013.01); *G06T 3/4053* (2013.01); *G06T 5/50* (2013.01);
(Continued)

(58) Field of Classification Search
CPC ............ G06K 9/00791; G06K 9/2054; G06K 9/3233; G06K 9/3258; G06K 9/623;
(Continued)

(56) References Cited

U.S. PATENT DOCUMENTS

| | | | |
|---|---|---|---|
| 7,526,102 B2 * | 4/2009 | Ozer | G06K 9/00228 382/103 |
| 8,265,338 B2 | 9/2012 | Barrow | |

(Continued)

FOREIGN PATENT DOCUMENTS

| | | |
|---|---|---|
| EP | 2733921 A1 | 5/2014 |
| GB | 2492689 A | 1/2013 |

OTHER PUBLICATIONS

International Preliminary Report on Patentability for International Application No. PCT/US2016/065909 dated Jun. 20, 2019. 9 pages.
(Continued)

*Primary Examiner* — Christopher S Kelley
*Assistant Examiner* — Ana Picon-Feliciano
(74) *Attorney, Agent, or Firm* — Lerner, David, Littenberg, Krumholz & Mentlik, LLP (57) ABSTRACT

A vehicle mounted imaging system tracks and resolves image using an object image regions of interest at a higher resolution than that which can be provided by typical wide-angle optics. The imaging system includes an object identification camera, a sampling camera, and one or more computing devices. The one or more computing devices obtain a full-frame image from the object identification camera and identify at least one region of interest within the full frame image. The one or more computing devices then configure the sampling camera to capture images of a sampling area containing the region of interest, wherein the sampling area consists of some, but not all, of a field of view of the sampling camera. Using a super-image resolution technique, the one or more computing devices create a high-resolution image of the region of interest from a plurality of images captured by the sampling camera.

20 Claims, 7 Drawing Sheets

(51) Int. Cl.
  *G06K 9/62*  (2022.01)
  *G06T 3/40*  (2006.01)
  *G06T 5/50*  (2006.01)
  *H04N 5/232* (2006.01)
  *H04N 13/25* (2018.01)
  *G06V 10/25* (2022.01)
  *G06V 20/56* (2022.01)
  *G06V 20/62* (2022.01)

(52) U.S. Cl.
  CPC .............. *G06T 7/292* (2017.01); *G06V 10/25* (2022.01); *G06V 20/56* (2022.01); *G06V 20/63* (2022.01); *H04N 5/23238* (2013.01); *H04N 13/25* (2018.05)

(58) Field of Classification Search
  CPC ......... G06T 3/4053; G06T 5/50; G06T 7/292; H04N 13/25; H04N 5/23238; G06V 10/22; G06V 10/25; G06V 20/56; G06V 20/63
  USPC ..................................... 348/36, 39, 118, 148
  See application file for complete search history.

(56) References Cited

U.S. PATENT DOCUMENTS

| | | | |
|---|---|---|---|
| 9,020,302 | B2 | 4/2015 | Shmunk |
| 9,549,125 | B1* | 1/2017 | Goyal ................ H04N 5/23216 |
| 2006/0227997 | A1* | 10/2006 | Au .................. G08B 13/19682 |
| | | | 382/103 |
| 2011/0019924 | A1 | 1/2011 | Elgersma et al. |
| 2011/0164108 | A1 | 7/2011 | Bates et al. |
| 2011/0190972 | A1* | 8/2011 | Timmons ................ G08G 1/166 |
| | | | 701/31.4 |
| 2011/0234749 | A1* | 9/2011 | Alon ..................... G08G 1/054 |
| | | | 348/36 |
| 2014/0132735 | A1* | 5/2014 | Lee ...................... H04N 5/2258 |
| | | | 348/47 |
| 2014/0193032 | A1* | 7/2014 | Zhang .................. G06T 3/0012 |
| | | | 382/103 |
| 2014/0247323 | A1 | 9/2014 | Griffis et al. |
| 2014/0375820 | A1* | 12/2014 | Priyantha ............ H04N 5/2258 |
| | | | 348/164 |
| 2016/0165178 | A1 | 6/2016 | al-Salem et al. |
| 2016/0171657 | A1 | 6/2016 | Matson et al. |
| 2016/0171715 | A1 | 6/2016 | Matson et al. |
| 2017/0270375 | A1* | 9/2017 | Grauer ................ G06K 9/6293 |
| 2018/0218224 | A1* | 8/2018 | Olmstead ......... G08B 13/19643 |

OTHER PUBLICATIONS

Yamauchi H et al: "A Far Road Sign Recognition by Applying Super-Resolution to Extracted Regions from Successive Frames", Mechatronics, ICM2007 4th IEEE International Conference On, IEEE, Piscataway, NJ, USA, May 8, 2007 (May 8, 2007), pp. 1-5, XP031260755, ISBN: 978-1-4244-1183-2.

International Search Report and Written Opinion for PCT Application No. PCT/US2016/065909 dated Sep. 15, 2017. 15 pages.

Examination Report for European Patent Application No. 16826223.6 dated Feb. 22, 2021. 6 pages.

\* cited by examiner

FEATURE RECOGNITION ASSISTED SUPER-RESOLUTION METHOD

CROSS-REFERENCE TO RELATED APPLICATION

This application is a national phase entry under 35 U.S.C. § 371 of International Application No. PCT/US2016/065909, filed Dec. 9, 2016, the entire disclosure of which is incorporated herein by reference.

BACKGROUND

Often it is difficult to resolve semantic data, such as signs and storefront text, using a vehicle mounted imaging system. Furthermore, capturing full-sized, color panoramas is a time-intensive process and it can burden a data pipeline.

BRIEF SUMMARY

One aspect of the disclosure provides a method for obtaining a high-resolution image of a region of interest. The method comprises obtaining, using one or more processors, a first image from a first camera; identifying, using the one or more processors, a region of interest within the first image; configuring, using the one or more processors, a second camera to capture images of a sampling area containing the region of interest, wherein the sampling area consists of some, but not all, of a field of view of the second camera; receiving, using the one or more processors, a plurality of images captured by the second camera; and creating, using the one or more processors, an enhanced image of the region of interest from the plurality of images captured by the second camera, wherein a resolution of the region of interest within the enhanced image is higher than a resolution of the region of interest within any one of the plurality of images captured by the second camera.

Another aspect of the disclosure provides a method for obtaining a high-resolution image of one or more regions of interest. The method comprises obtaining, using one or more processors, a first image from a first camera; identifying, using the one or more processors, a plurality of regions of interest within the first image; configuring, using the one or more processors, a second camera to capture images of one or more sampling areas each containing one or more of the plurality of regions of interest, wherein a combined area of the one or more sampling areas consists of some, but not all, of a field of view of the second camera; receiving, using the one or more processors, a plurality of images captured by the second camera; and using a super-image resolution technique to create a high-resolution image of one or more of the plurality of regions of interest from the plurality of images captured by the second camera. creating, using the one or more processors, one or more enhanced images of the plurality of regions of interest from the plurality of images captured by the second camera, wherein a resolution of any one of the regions of interest within the one or more enhanced images is higher than a resolution of any one of the corresponding regions of interest within the plurality of images captured by the second camera.

Yet another aspect of the disclosure provides a system for obtaining a high-resolution image of a region of interest. The system comprises a first camera; a second camera; and one or more computing devices. The one or more computing devices are configured to: obtain a first image from a first camera; identify a region of interest within the first image; configure a second camera to capture images of a sampling area containing the region of interest, wherein the sampling area consists of some, but not all, of a field of view of the second camera; receive a plurality of images captured by the second camera; and create an enhanced image of the region of interest from the plurality of images captured by the second camera, wherein a resolution of the region of interest within the enhanced image is higher than a resolution of the region of interest within any one of the plurality of images captured by the second camera.

Another aspect of the disclosure provides a method comprising: controlling a first camera to capture a first image of a scene; processing the first image to identify a region of interest within the scene; controlling a second camera to capture plural images, wherein each of the plural images relates to a sampling area that constitutes part of but not the whole of a field of view of the second camera, and wherein the sampling area corresponds to the region of interest within the scene; and using a super-image resolution technique to create a high-resolution image of the region of interest within the scene from the plural images captured by the second camera.

An implementation incorporating these features can allow the first camera to be used for purposes other than capturing images for use in super-image resolution processing whilst not requiring the second camera to be used for purposes other than super-image resolution image generation. This can allow simple system design, and can allow relatively unsophisticated cameras to be used. By controlling the second camera to capture images relating to a sampling area that constitutes part of but not the whole of a field of view of the second camera, additional visual information from the region of interest may be derived without requiring additional capture of information from other areas of the field of view. Additionally, the avoidance of additional capture of information can be achieved at hardware level, thereby avoiding the overhead that would be associated with capturing image data that is not processed. Super-image resolution processing may be performed at or local to a device incorporating the first and second cameras, which can minimize utilization of communication resources to transmit image data. Alternatively, super-image resolution processing may be performed remotely to a device incorporating the first and second cameras, for instance at a remote server or in the cloud. This can reduce the processing requirements of the device incorporating or connected locally to the first and second cameras, and can also reduce overall processing since it allows processing of the same information captured by different capturing devices (at substantially the same time or at different times) to be avoided. Features of the embodiments can allow information contained in regions of interest within the scene to be obtained (using super-image resolution processing) whilst allowing panoramic or other relatively wide field of view camera equipment as the first camera.

The method may comprise controlling the second camera to capture plural images relating to a sampling area that is larger than and encompasses the region of interest within the scene.

This method may comprise controlling the second camera to capture plural images relating to a sampling area that has dimensions dependent on parameters derived from captured images.

The method may comprise: processing the first image to identify at least two regions of interest within the scene; controlling the second camera to capture plural images for each of plural sampling areas, wherein each sampling area corresponds a respective region of interest within the scene;

and using a super-image resolution technique to create a high-resolution image of each region of interest of the scene from the plural images captured by the second camera.

This method may comprise: selecting a subset of the regions of interest; and controlling the second camera to capture plural images for each of plural sampling areas, wherein each sampling area corresponds a respective selected region of interest within the scene.

The method may comprise comprising controlling the second camera to capture images at a capture rate higher than a capture rate of the first camera.

The method may comprise tracking the region of interest to a different position within the field of view of the first camera; and controlling the second camera to capture images from a different portion of the field of view of the second camera, wherein the different portion of the field of view of the second camera corresponds to the different position within the field of view of the first camera.

Processing the first image to identify at least one region of interest within the scene may comprise using hardware configured to detect image data with characteristics of interest without executing computer code.

This can allow implementation in a relatively power efficient manner and without utilizing significant computing processing resources, which can therefore be omitted or allocated to other tasks. By configuring the hardware for detecting image data in a suitable manner, the hardware can be re-used for detecting regions of interest in images from multiple camera sensors and/or from a given camera sensor at different times, thereby providing a relatively efficient use of the hardware.

The method may comprise processing the first image to identify at least one region of interest within the scene comprises detecting text in the scene.

This can allow the detection of semantic information such as road signs, store titles, door numbers etc. In turn, this can allow the relatively frequent updating of information in databases such as transport infrastructure databases, map databases, geographic information databases etc. By updating map or geographic information databases (such as may be used to provide the system known as Google Maps, and other such services) relatively frequently, users can be provided with more up-to-date geographic information. By updating transport infrastructure databases (such as may be used by autonomous vehicles or by navigation guidance services), guidance and/or navigation functions can be improved by reducing occurrences of incorrect information being used in decision-making and route-planning.

DETAILED DESCRIPTION

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. For example, while certain processes in accordance with example embodiments are shown in the figures as occurring in a linear fashion, this is not a requirement unless expressly stated herein. Different processes may be performed in a different order or concurrently. Steps may also be added or omitted unless otherwise stated.

Figure 1:
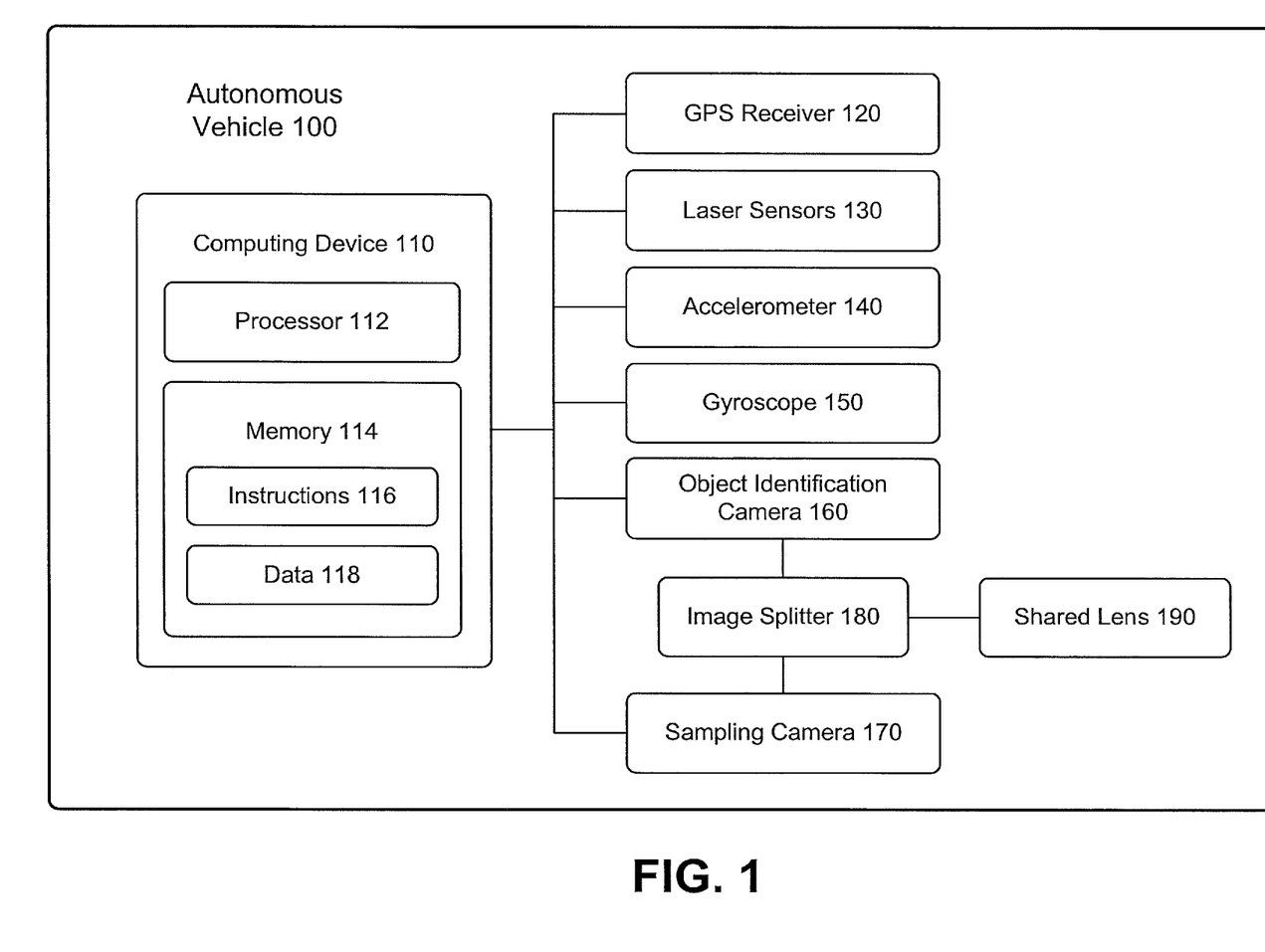
FIG. 1 is a functional diagram of an example autonomous vehicle in accordance with aspects of the disclosure.

As shown in FIG. 1, a vehicle 100 in accordance with one aspect of the disclosure includes various components. The vehicle 100 may be any one of a car, boat, plane, etc. The vehicle 100 may also be an autonomous vehicle. The vehicle 100 may have one or more computing devices, such as the computing device 110, which contains processor 112, memory 114, instructions 116, data 118, and other components typically present in general purpose computing devices.

The processor 112 may be any conventional processor, such as commercially available CPUs. Alternatively, the processor 112 may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a different housing from that of computing device 110. Accordingly, references to a processor or computing device will be understood to include references to a collection of processors or computing devices or memories that may or may not operate in parallel.

The memory 114 stores information accessible by the processor 112, including instructions 116 and data 118 that may be executed or otherwise used by the processor 112. The memory 114 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 116 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 118 may be retrieved, stored or modified by processor 112 in accordance with the instructions 116. The data 118 may include detailed map information, e.g., highly detailed maps identifying the shape and elevation of roadways, lane lines, intersections, crosswalks, speed limits, traffic signals, buildings, signs, real time traffic information, vegetation, or other such objects and information. Furthermore, the data may be stored in computing device registers, in a relational database as a table having a plurality of different fields and records, XML documents or flat files. The data may also be formatted in any computing device-readable format.

As shown in FIG. 1, the computing device 110 may be capable of communicating with various components of the vehicle 100. For example, the computing device 110 may be in communication with GPS receiver 120, laser sensors 130, accelerometer 140, gyroscope 150, object identification camera 160, and sampling camera 170. Although these systems are shown as being external to computing device 110, these systems may also be incorporated into computing device 110. Computing device 110 may also include one or more wireless network connections to facilitate communication with other computing devices. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The GPS receiver 120 may be used by the computing device 110 to determine the relative or absolute position on a map or on the earth of the vehicle 100. For example, the GPS receiver 120 may be used by the computing device 110 to determine the latitude, longitude and/or altitude position of the vehicle 100.

The laser sensors 130 (e.g., LIDAR sensors) may be used by the computing device 110 to generate a point cloud representation of nearby objects. A point cloud representation is a representation of the dimensions of the real-world objects, such as buildings, facades, windows, etc. within the image. For example, a laser generates a beam that is aimed at different objects within a location, such as a neighborhood. The sensor associated with the laser collects the laser beam that is reflected from the real-world objects and generates a point cloud in the (x, y, z) coordinate system that is based on the collected laser beam. A person skilled in the art will appreciate that an "x" coordinate indicates the horizontal axis in the point cloud, a "y" coordinate indicates a vertical axis in the point cloud, and a "z" coordinate indicates a depth in the point cloud. Thus, when a laser sprays a laser beam onto the building, the resulting point cloud reflects the facade, roof, windows, doors, etc. that are of varying depths of the sprayed building. A person skilled in the art will appreciate that the denser the laser spray, the more accurate the point cloud of the actual real-world object is produced.

The accelerometer 140 and the gyroscope 150 may be used by the computing device 110 to determine the direction and speed of the vehicle 100 or changes thereto. By way of example only, these devices may be used by the computing device 110 to determine the pitch, yaw or roll (or changes thereto) of the vehicle 100 relative to the direction of gravity or a plane perpendicular thereto. These devices may also be used to log increases or decreases in speed and the direction of such changes.

The object identification camera 160 and the sampling camera 170 may be used by the computing device 110 as part of a camera-based localization system. The object identification camera 160 and the sampling camera 170 can be arranged, for example, in a cluster on the roof of the vehicle 100. The object identification camera 160 and the sampling camera 170 may also be placed in a protective housing. Furthermore, if parallax is a concern, both cameras can share a lens (e.g., shared lens 190) and have common field of view ("FOV") through the use of one or more beam-splitters and/or image-splitters (e.g., image splitter 180).

The object identification camera 160 may be used to capture full-frame images at a nominal rate. The object identification camera 160 has an FOV that fully encompasses the FOV of the sampling camera 170. The computing device 110 analyzes the images captured by the object identification camera 160 to identify regions of interest ("ROIs"). A region of interest may include semantic information, such as a sign or storefront text, or any other object of interest. The computing device 110 may utilize a hardware-accelerated machine learning model to identify and rank ROIs based on one or more of the following: actual or potential semantic content contained within the ROI, location of the ROI relative to other objects (e.g., an ROI located at or near a storefront is likely to contain high-value information such as store hours, notices, etc.), estimated persistence of the ROI within the FOV of the sampling camera 170, other characteristics such as the size, color, and contrast of the ROI, user-defined parameters, etc. ROIs below a certain rank may, for example, be ignored by the computing device 110.

The sampling camera 170 is dedicated to capturing partial-frame images at a rapid rate. After the computing device 110 has identified a list of one or more ROIs, it configures the sampling camera 170 to capture images of one or more sampling areas within the sampling camera 170's FOV. Each of the sampling areas comprises at least one ROI. The sampling areas may also comprise a buffer region around the one or more ROIs. The buffer region can be used to compensate for estimation errors that arise from tracking the ROI(s). The sampling areas may be a basic shape, such as a rectangle, or they may resemble the shapes of the ROI(s). The shape of the sampling areas may also be based on the predicted movement of vehicle 100. Once the sampling camera 170 is configured, it can rapidly capture images of the one or more sampling areas. The rate at which the sampling camera 170 can capture images of the one or more sampling areas is dependent on the size of those areas. Specifically, the smaller the sampling areas, the more rapidly the sampling camera 170 can capture images of those areas.

While the sampling camera 170 is capturing images, the location(s) of the ROI(s) within its FOV may change. As a result, it may be necessary to change the size, shape, and/or location of the sampling areas over time. The computing device 110 may utilize a contour-based video tracking algorithm to follow the ROI(s). For example, the computing device 110 can estimate the trajectory of a particular ROI by comparing two or more full-frame images captured by the object identification camera 160. The location of that particular ROI within the two or more full-frame images may be identified by maximizing a similarity parameter.

Over time, the computing device 110 may update the list of ROIs. For example, as vehicle 100 moves, some ROIs may leave the FOV of the sampling camera 170 and other new ROIs may enter the FOV of the sampling camera 170. Thus, the computing device 110 may need to reconfigure the sampling camera 170 by eliminating sampling areas associated with ROIs outside the FOV of the sampling camera 170 and adding sampling areas that comprise at least one new ROI.

After the sampling camera 170 has rapidly captured a plurality of images of the one or more sampling areas, the computing device 110 can utilize a super-resolution technique to synthesize a high-resolution image of the one or more ROIs. This process may involve cropping the captured images to remove a buffer area. The process may also involve aligning and/or resizing the cropped images of the ROIs. Ultimately, by using a super-resolution technique, the computing device 110 can generate imagery which exceeds the spatial resolution of the object identification camera 160 and the sampling camera 170.

With high-resolution images of ROIs, the computing device 110 can more effectively control the vehicle 100. For example, by using the object identification camera 160 and the sampling camera 170 as described above, the computing device 110 may be able more accurately resolve the text on a sign or a nearby storefront. The computing device 110 can then use this information to determine or verify the location of the vehicle 100 previously obtained from the GPS receiver 120. The high-resolution images of ROIs may also allow the computing device 110 to react more quickly to the surrounding environment. For example, the computing device 110 may be able to resolve the text on a stop sign or a yield sign from farther away. Higher resolution imagery may also aid the computing device 110 in constructing more robust depth data. For example, the computing device 110 may employ an edge-detection technique on a high resolution image of an ROI and use those results to verify the accuracy of a corresponding point cloud representation obtained from the laser sensors 130.

While a number of components of the vehicle 100 are described above and illustrated in FIG. 1, it should be understood that any number of additional components may be included. Moreover, some components that are illustrated may be omitted.

Figure 2:
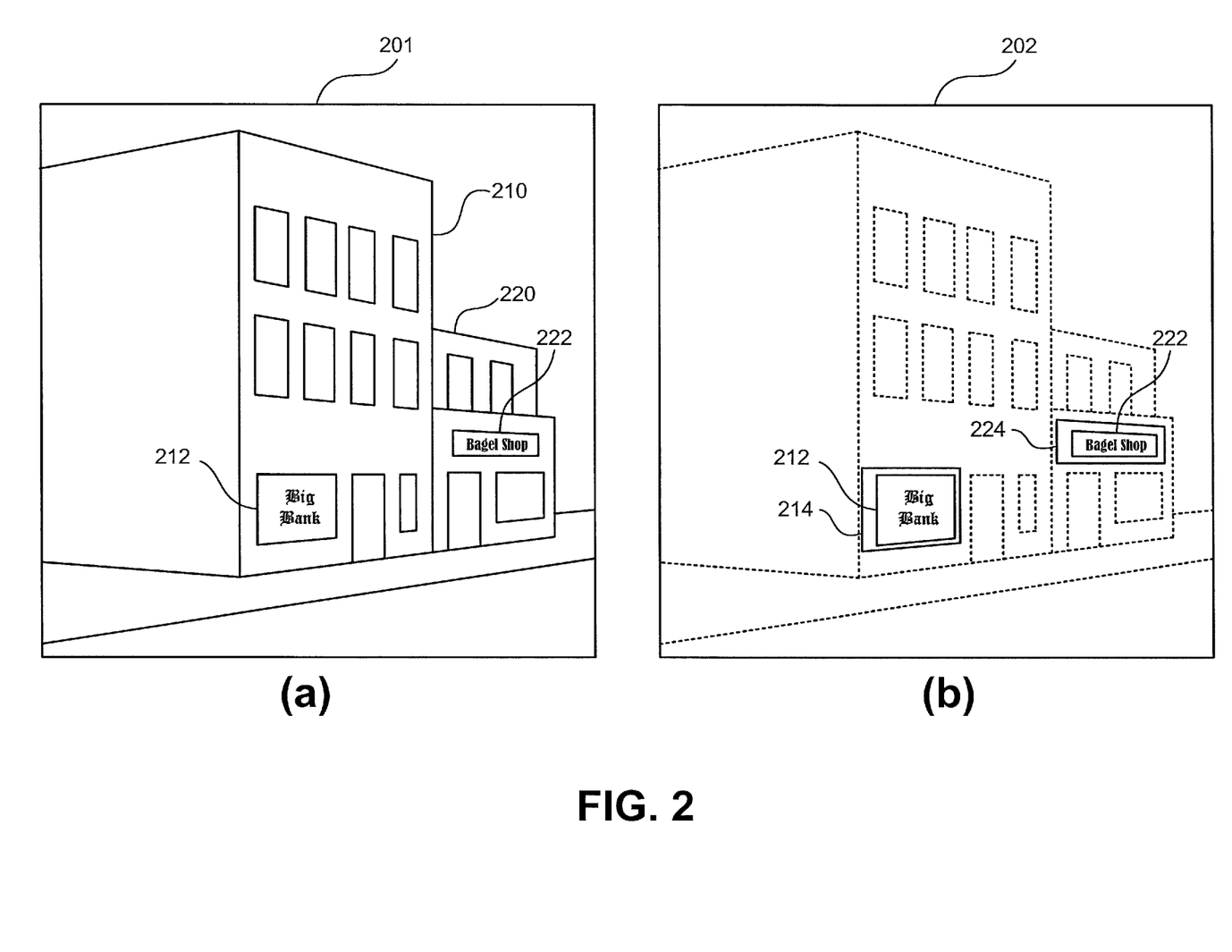
FIG. 2 illustrates the fields of view of an object identification camera and a sampling camera in accordance with aspects of the disclosure.

FIGS. 2-6 illustrate various aspects of the technology described above. FIG. 2 depicts FOV 201, which is associated with an object identification camera, and FOV 202, which is associated with a sampling camera. Both cameras are located on the roof of a car with one or more computing devices. In this illustration, the FOVs of the two cameras are identical. At the moment in time depicted in FIG. 2, both cameras can see buildings 210 and 220. Building 210 includes window 212, which contains the text "Big Bank" in a first font, such as an Old English Text MT font. Building 220 includes sign 222, which contains the text "Bagel Shop" in a second font, such as a Bernard MT Condensed font. Window 212 and sign 222 are non-limiting examples of potential ROIs that a car utilizing the present technology may come across. Other ROIs may contain, for example, text having a different size, font, typeface, color, content, etc. In this example, window 212 and sign 222 are ROIs. In FOV 201, everything is depicted with a solid line because everything is captured by the object identification camera. However, in FOV 202, only the portions of the objects within sampling areas 214 and 224 are depicted with solid lines. This is because the sampling camera only captures the content within the sampling areas 214 and 224. Everything else is ignored.

In FIG. 2, the sampling areas 214 and 224 have shapes that roughly approximate window 212 and sign 222, the ROIs. However, the sampling areas 214 and 224 are not centered on these objects. Instead, the buffer region on the left sides of window 212 and sign 222 is larger than the buffer region on the rights sides of those objects. This may be advantageous when the vehicle is traveling below the speed limit. In such a situation, the vehicle is more likely to accelerate at any given moment. Thus, to ensure that window 212 and sign 222 are within the sampling areas 214 and 224, the buffer region must be large enough to accommodate the scenario where the vehicle maintains speed and the scenario where the vehicle accelerates.

Figure 3:
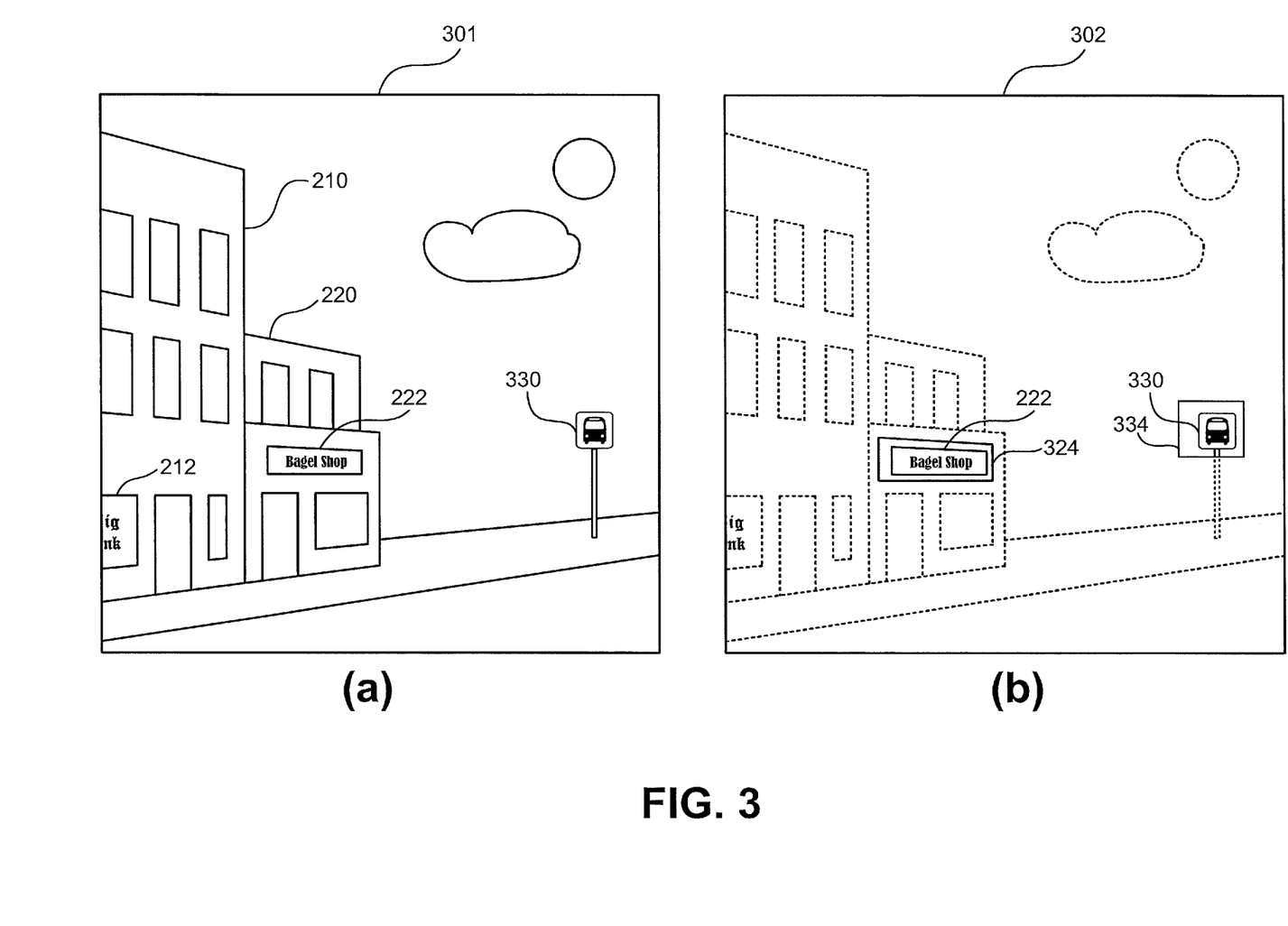
FIG. 3 illustrates the fields of view of an object identification camera and a sampling camera in accordance with aspects of the disclosure.

FIG. 3 illustrates what the cameras of FIG. 2 may see at a later point in time. In FIG. 3, FOV 301 is associated with the object identification camera and FOV 302 is associated with the sampling camera. At the moment in time depicted in FIG. 3, both cameras can still see buildings 210 and 220. However, a portion of building 210 is now outside FOVs 301 and 302. Furthermore, FOVs 301 and 302 now include sign 330, which pictorially indicates that there is a bus stop nearby. Much like FOV 201, everything in FOV 301 is depicted with a solid line because everything is captured by the object identification camera. Furthermore, much like FOV 202, only the portions of the objects within sampling areas 324 and 334 are depicted with solid lines, because the second camera only captures the portions of the objects within those areas. However, in FIG. 3, window 212 is not included in a sampling area. Instead, sign 222 and sign 330 are included in sampling areas 324 and 334 respectively. In this scenario, the one or more computing devices may have ranked window 212, sign 222, and sign 330, and determined that window 212 had too low of a rank. For example, the computing device may be configured to only generate sampling areas for the two ROIs with the highest rankings. As shown in FIG. 3, window 212 would likely have a low rank because a large portion of it is outside FOV 302.

Figure 4:
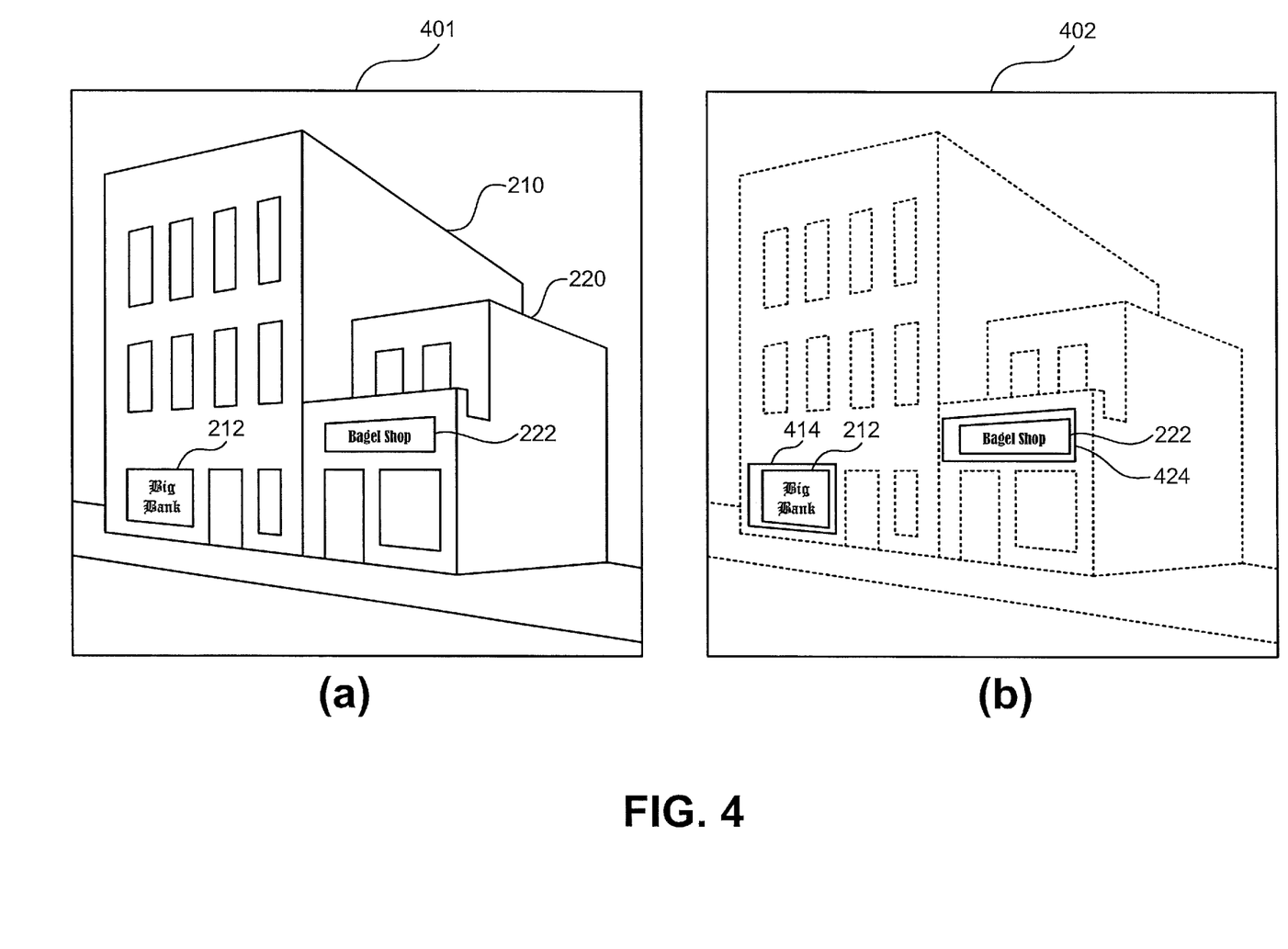
FIG. 4 illustrates the fields of view of an object identification camera and a sampling camera in accordance with aspects of the disclosure.

FIG. 4 demonstrates that a vehicle utilizing the present technology may include multiple object identification cameras and multiple sampling cameras. For example, the vehicle described in FIGS. 2 and 3 may have a backwards-facing object identification camera with FOV 401 and a backwards-facing sampling camera with FOV 402. Much like the scenario depicted in FIG. 2, the backwards-facing cameras can see buildings 210 and 220, window 212, and sign 224. Furthermore, the sampling camera is capturing the content within sampling areas 414 and 424. In this scenario, the one or more computing devices can utilize images from the front-facing sampling camera and the backwards-facing sampling camera to generate a high-resolution image of window 212 and sign 224 using a super-resolution technique. This may be accomplished, in part, by cropping and aligning the images obtained both sampling camera. Furthermore, the super-resolution technique can be performed in the spatial domain (e.g., using Maximum Likelihood ("ML"), Maximum a Posteriori ("MAP"), or Projection onto Convex Sets ("POCS") methods) or the frequency domain (e.g., using the shift and aliasing properties of the Continuous and Discrete Fourier Transforms). The super-resolution technique may also involve machine learning. For example, a computing device can be trained to learn the relationship between pairs of low-resolution and high-resolution images of the same ROI.

Figure 5:
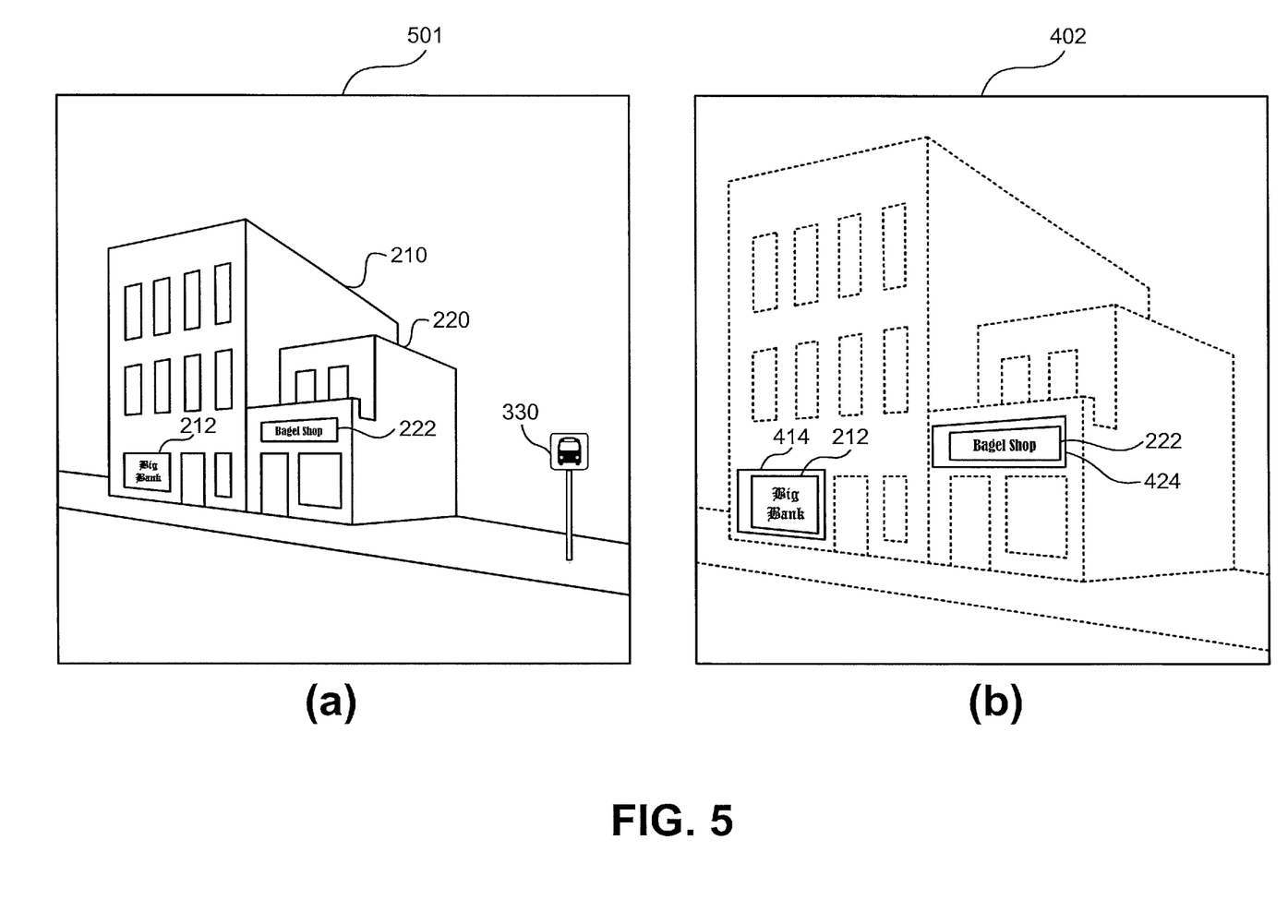
FIG. 5 illustrates the fields of view of an object identification camera and a sampling camera in accordance with aspects of the disclosure.

FIG. 5 demonstrates that the FOVs of the object identification cameras and the sampling cameras do not need to be identical. For example, as shown in FIG. 5, FOV 501, which is associated with an object identification camera, can contain more content than FOV 402, which is associated with the sampling camera of FIG. 4. As shown in FIG. 5, the object identification camera can see sign 330, but the sampling camera cannot. In other related examples, more than one sampling camera may be used with a particular object identification camera. For example, the object identification camera may have an FOV that contains the FOVs of two or more sampling cameras. Therefore, information obtained from the object identification camera can be used to configure the sampling areas used by the two or more sampling cameras. Similarly, multiple object identification cameras can be used with a single sampling camera. In such a scenario, the object identification cameras may have a combined FOV that contains the FOV of the singular sampling camera.

Figure 6:
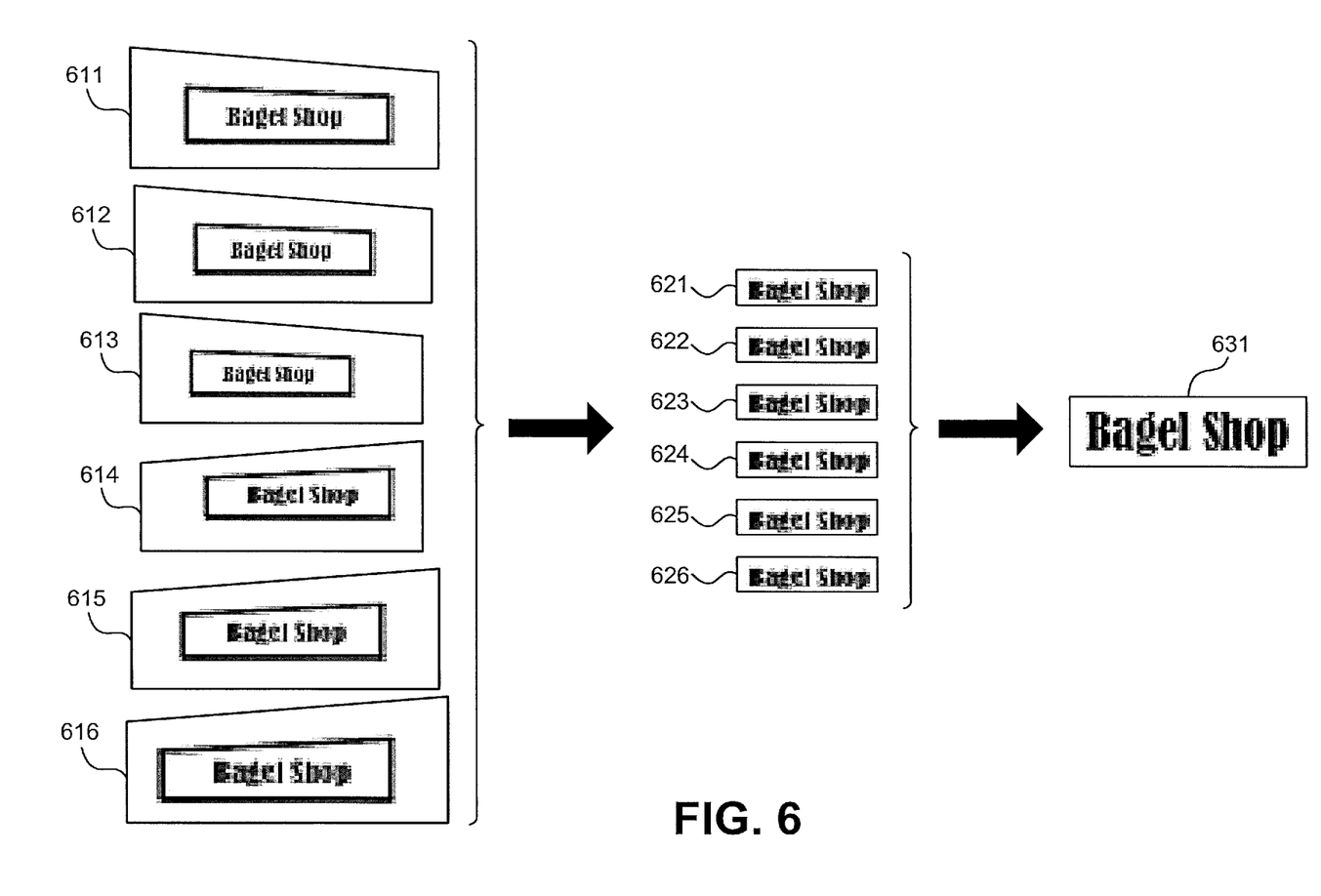
FIG. 6 illustrates portions of a super-resolution process that may be used by one or more computing devices in accordance with aspects of the disclosure.

FIG. 6 illustrates portions of the super-resolution process that may be used by the one or more computing devices of the vehicle of FIGS. 2-5. In FIG. 6, the input images 611-616 have different shapes and sizes. The input images 611-616 were obtained from the sampling cameras of FIGS. 2-5. The ROI (i.e., sign 222 from FIGS. 2-5) has a different location within each of the input images 611-616. This is due to the estimation error resulting from when the one or more computing devices attempted to predict the location of the ROI within the FOV of the sampling cameras as the vehicle moved. As shown in FIG. 6, the input images 611-616 are cropped to create the cropped images 621-626. The cropping process removed the area surrounding the ROI in the input images 611-616. By using a super-resolution technique, the one or more computing devices can generate the high-resolution image 631 from cropped images 621-626. The super-resolution technique can be performed in the spatial domain (e.g., using Maximum Likelihood ("ML"), Maximum a Posteriori ("MAP"), or Projection onto Convex Sets ("POCS") methods) or the frequency domain (e.g., using the shift and aliasing properties of the Continuous and Discrete Fourier Transforms). The super-resolution technique may also involve machine learning. For example, a computing device can be trained to learn the relationship between pairs of low-resolution and high-resolution images of the same ROI. By using the high-resolution image 631, the one or more computing devices can more accurately interpret the text of the ROI.

Figure 7:
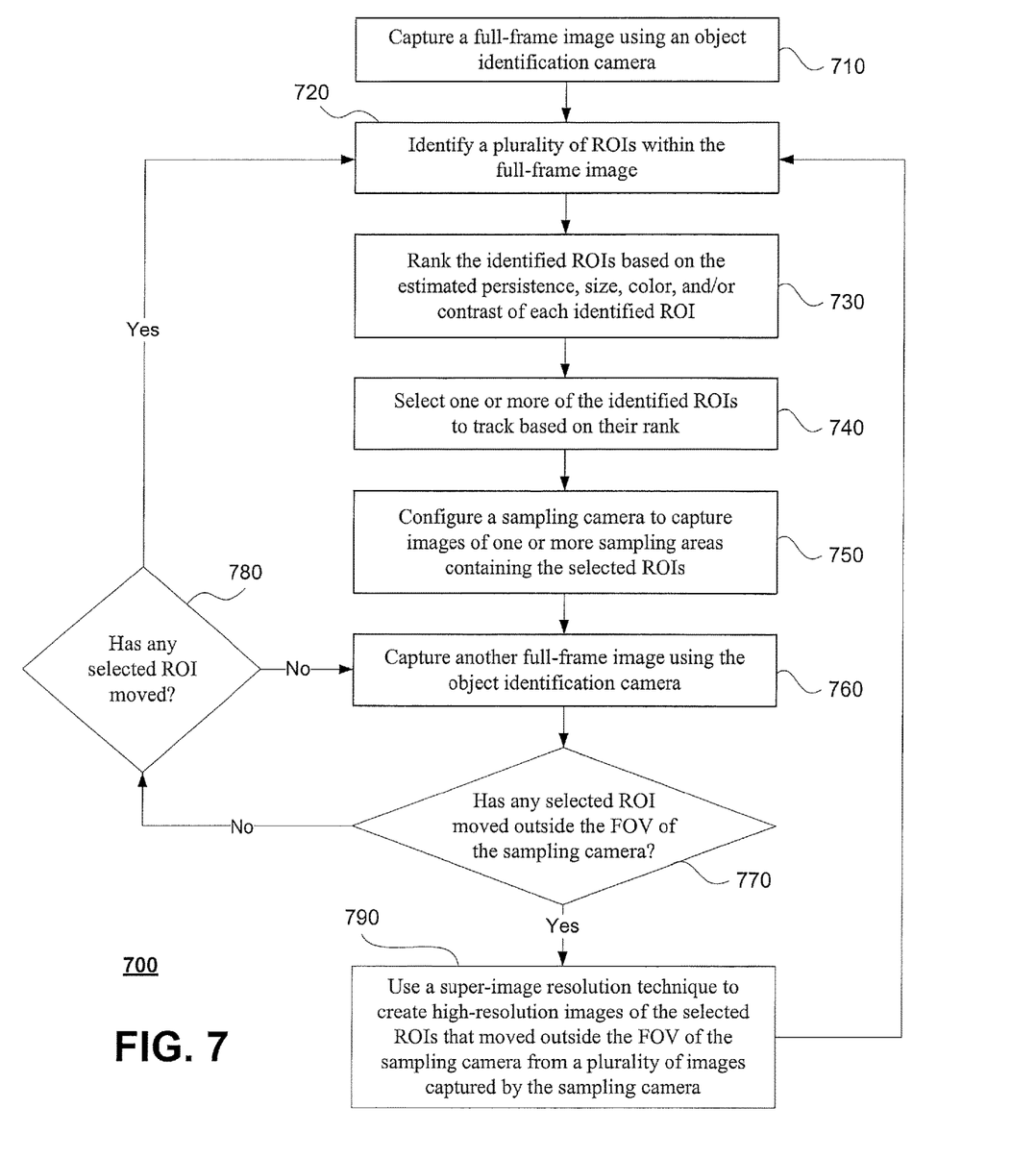
FIG. 7 illustrates a method for obtaining a high-resolution image of a region of interest in accordance with aspects of the disclosure.

FIG. 7 illustrates a method in accordance with the present technology. The method may be implemented by a vehicle including, for example, a computing device, an object identification camera, and a sampling camera. While operations of the method are described in a particular order below, it should be understood that the order of the operations may be modified. Moreover, some operations may be performed simultaneously. Further, operations may be added or omitted.

In block 710, the object identification camera is used to capture a full-frame image at a nominal rate. The FOV of the object identification camera may fully encompass the FOV of the sampling camera. Therefore, the full-frame image may capture the entire scene within the FOV of the sampling camera at a particular point in time.

In blocks 720 and 730, one or more ROIs are identified within the full-frame image and ranked. For example, a computing device may utilize a hardware-accelerated machine learning model to identify and rank ROIs based on one or more of the following: actual or potential semantic content contained within the ROI, location of the ROI relative to other objects (e.g., an ROI located at or near a storefront is likely to contain high-value information such as store hours, notices, etc.), estimated persistence of the ROI within the FOV of the sampling camera, other characteristics such as the size, color, and contrast of the ROI, user-defined parameters, etc.

In block 740, some of the identified ROIs are selected based on their rankings. In block 750, a sampling camera is configured to capture images consisting essentially of one or more sampling areas containing the selected ROIs. The sampling areas may also comprise a buffer region around the one or more ROIs. The buffer region can be used to compensate for estimation errors that arise from tracking the ROI(s). The sampling areas may be a basic shape, such as a rectangle, or they may resemble the shapes of the ROI(s). The shape of the sampling areas may also be based on the predicted movement of the vehicle.

In block 760, another full-frame image is captured by the object identification camera. In blocks 770 and 780, the new full-frame image is analyzed to determine whether any of the selected ROIs moved and whether any of the selected ROIs outside the FOV of the sampling camera. If a selected ROI simply moved, but it is still within the FOV of the sampling camera, then the sampling camera needs to be reconfigured. On the other hand, if an ROI moved outside the FOV of the sampling camera, then presumably the sampling camera cannot capture any more images of that ROI. Therefore, the method can proceed to block 790.

In block 790, a super-image resolution technique is used to create high-resolution images of the selected ROIs that moved outside the FOV of the sampling camera from a plurality of images captured by the sampling camera. After block 790 is complete, the method can be repeated and new high-resolution images of different ROIs can be created over time.

An implementation incorporating the technology disclosed herein can allow a first camera to be used for purposes other than capturing images for use in super-image resolution processing whilst not requiring a second camera to be used for purposes other than super-image resolution image generation. This can allow simple system design, and can allow relatively unsophisticated cameras to be used. By controlling the second camera to capture images relating to a sampling area that constitutes part of but not the whole of a field of view of the second camera, additional visual information from the region of interest may be derived without requiring additional capture of information from other areas of the field of view. Features of the embodiments can allow information contained in regions of interest within a scene to be obtained (using super-image resolution processing) whilst allowing panoramic or other relatively wide field of view camera equipment as the first camera.

Additionally, the avoidance of additional capture of information can be achieved at hardware level, thereby avoiding the overhead that would be associated with capturing image data that is not processed. Super-image resolution processing may be performed at or local to a device incorporating the first and second cameras, which can minimize utilization of communication resources to transmit image data. Alternatively, super-image resolution processing may be performed remotely to a device incorporating the first and second cameras, for instance at a remote server or in the cloud. This can reduce the processing requirements of the device incorporating or connected locally to the first and second cameras, and can also reduce overall processing since it allows processing of the same information captured by different capturing devices (at substantially the same time or at different times) to be avoided.

Aspects of the present technology also can allow the detection of semantic information such as road signs, store titles, door numbers etc. In turn, this can allow the relatively frequent updating of information in databases such as transport infrastructure databases, map databases, geographic information databases etc. By updating map or geographic information databases relatively frequently, users can be provided with more up-to-date geographic information. By updating transport infrastructure databases (such as may be used by autonomous vehicles or by navigation guidance services), guidance and/or navigation functions can be improved by reducing occurrences of incorrect information being used in decision-making and route-planning.

The present technology has mostly been described in the context of autonomous vehicles. However, aspects of the systems and methods described above may also be useful in other contexts. For example, a vehicle designed to collect street-view images could benefit from having an object identification camera and a sampling camera similar to those described above. In this scenario, portions of the full-frame images captured by the object identification camera could be enhanced by the high-resolution images of ROIs generated from the low-resolution images obtained from the sampling camera. Thus, the vehicle could collect higher quality street-view images. The present technology also has potential uses in aerial and multispectral imagery where one may be interested in imaging and identifying certain types of objects from a higher altitude. The present technology may also reduce hardware costs. Generally, a collection of cameras capable obtaining raw low-resolution imagery is often less expensive than a larger, single-lens system capable of obtaining raw high-resolution raw imagery.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A method for obtaining a high-resolution image of a region of interest, the method comprising:
   obtaining, using one or more processors, a first image from a first camera on a moving vehicle;
   identifying, using the one or more processors, one or more regions of interest within the first image;
   configuring, using the one or more processors, a second camera on the moving vehicle to capture partial frame images comprising a sampling area containing a first region of interest of the one or more regions of interest, wherein the configuring comprises generating the sampling area based on a ranking of the one or more regions of interest, wherein the sampling area consists of some, but not all, of a field of view of the second camera;
   tracking, using the one or more processors, the first region of interest within the field of view of the second camera as the second camera moves along with the vehicle;
   reconfiguring, using the one or more processors, the second camera to capture images of the sampling area containing the first region of interest in dependence on the tracking of the region of interest, reconfiguring of the second camera comprising reconfiguring of one or more of the size, shape, or location of the sampling area;
   receiving, using the one or more processors, a plurality of images captured by the second camera, including a second image captured before the reconfiguring and a third image captured after the reconfiguring; and
   creating, using the one or more processors, an enhanced image of the first region of interest from the plurality of images captured by the second camera, wherein a resolution of the first region of interest within the enhanced image is higher than a resolution of the first region of interest within any one of the plurality of images captured by the second camera.

2. The method of claim 1, wherein the first image was captured at a first rate and the plurality of images captured by the second camera were captured at a second rate, the second rate being faster than the first rate.

3. The method of claim 1, wherein a size and shape of the sampling area is based on at least one of a size and shape of the first region of interest, or a size and shape of an object within the first region of interest.

4. The method of claim 1, wherein tracking the first region of interest within the field of view of the second camera comprises:
   obtaining, using the one or more processors, a fourth image from the first camera; comparing, using the one or more processors, the first and fourth image; and determining, using the one or more processors, in dependence on the comparison,
   whether the first region of interest has moved within the field of view of the second camera.

5. The method of claim 1, wherein tracking the first region of interest within the field of view of the second camera comprises determining, using the one or more processors, a speed and direction in which the first camera and second camera are traveling relative to the first region of interest, and wherein reconfiguring, using the one or more processors, the second camera to capture images of a sampling area containing the first region of interest comprises reconfiguring one or more of a size, shape, and location of the sampling area in dependence on the determined speed and direction.

6. The method of claim 1, wherein the sampling area comprises a buffer region surrounding the first region of interest, and wherein a shape of the buffer region is determined in dependence on a speed and a direction in which the second camera is traveling relative to the first region of interest.

7. The method of claim 1, wherein the first region of interest contains text, and the method further comprises:
   obtaining, using the one or more processors, one or more of a latitude, longitude or altitude position of a vehicle comprising the first and second camera from a GPS receiver;
   interpreting, using the one or more processors, the text contained within the first region of interest by using the high-resolution image; and
   verifying, using the one or more processors, one or more of the latitude, longitude or altitude of the vehicle in dependence on the interpreted text.

8. The method of claim 1, further comprising:
   combining, using the one or more processors, the high-resolution image of the first region of interest with one or more images captured by the first camera to form an enhanced full-frame image.

9. A method for obtaining a high-resolution image of one or more regions of interest, the method comprising:
  obtaining, using one or more processors, a first image from a first camera on a moving vehicle;
  identifying, using the one or more processors, a plurality of regions of interest within the first image;
  configuring, using the one or more processors, a second camera on the moving vehicle to capture partial frame images of one or more sampling areas each containing one or more of the identified plurality of regions of interest, wherein a combined area of the one or more sampling areas consists of some, but not all, of a field of view of the second camera, and wherein the one or more regions of interest are selected based on a ranking of the identified plurality of regions of interest in accordance with at least semantic content contained within each of the plurality of regions of interest;
  tracking, using the one or more processors, the one or more regions of interest within the field of view of the second camera as the second camera moves along with the vehicle;
  reconfiguring, using the one or more processors, the second camera to capture images of the one or more sampling areas containing the one or more regions of interest in dependence on the tracking of the one or more regions of interest, reconfiguring of the second camera comprising reconfiguring of one or more of the size, shape, or location of the one or more sampling areas;
  receiving, using the one or more processors, a plurality of images captured by the second camera, including a second image captured before the reconfiguring and a third image captured after the reconfiguring; and
  using a super-image resolution technique to create one or more high-resolution images of one or more of the identified plurality of regions of interest from the plurality of images captured by the second camera;
  creating, using the one or more processors, one or more enhanced images of the identified plurality of regions of interest from the plurality of images captured by the second camera, wherein a resolution of any one of the regions of interest within the one or more enhanced images is higher than a resolution of any one of the corresponding regions of interest within the plurality of images captured by the second camera.

10. The method of claim 9, further comprising:
  ranking, using the one or more processors, the identified plurality of regions of interest in dependence on one or more of their size, color, or contrast; and
  selecting, using the one or more processors, the one or more of the identified plurality of regions of interest based on their rank,
  wherein the one or more sampling areas each contain one or more of the plurality of regions of interest within the selected one or more regions of interest, and
  wherein the super-image resolution technique is used to create one or more high-resolution images of one or more of the plurality of regions of interest within the one or more regions of interest.

11. The method of claim 10, wherein the identified plurality of regions of interest are further ranked in dependence on their estimated persistence within the field of view of the second camera.

12. The method of claim 10, wherein the identified plurality of regions of interest are further ranked in dependence on their location relative to one or more objects within the field of view of the second camera.

13. A system for obtaining a high-resolution image of a region of interest, the system comprising:
  a first camera on a vehicle;
  a second camera on the vehicle; and
  one or more computing devices configured to:
    obtain a first image from the first camera as the vehicle is moving;
    identify one or more regions of interest within the first image;
    configure the second camera to capture partial frame images of a sampling area containing a first region of interest of the one or more regions of interest as the vehicle is moving, wherein the sampling area consists of some, but not all, of a field of view of the second camera, wherein in configuring the second camera, the one or more computing devices are configured to generate the sampling area based on a ranking of the one or more regions of interest;
    track, using the one or more processors, the first region of interest within the field of view of the second camera as the second camera moves along with the vehicle;
    reconfigure, using the one or more processors, the second camera to capture images of a sampling area containing the first region of interest in dependence on the tracking of the first region of interest, reconfiguring of the second camera comprising reconfiguring of one or more of the size, shape, or location of the sampling area;
    receive a plurality of images captured by the second camera, including a second image captured before the reconfiguring and a third image captured after the reconfiguring; and
    create an enhanced image of the first region of interest from the plurality of images captured by the second camera, wherein a resolution of the first region of interest within the enhanced image is higher than a resolution of the first region of interest within any one of the plurality of images captured by the second camera.

14. The system of claim 13, wherein a size and shape of the sampling area is based on at least one of a size and shape of the region of interest, or a size and shape of an object within the first region of interest.

15. The system of claim 13, wherein the one or more computing devices are further configured to:
  obtain a fourth image from the first camera;
  compare the first and the fourth image;
  determine in dependence on the comparison, whether the first region of interest has moved within the field of view of the second camera.

16. The system of claim 13, wherein the one or more computing devices are further configured to:
  determine a speed and direction in which the first and second camera is traveling relative to the first region of interest; and
  reconfigure one or more of a size, shape, and location of the sampling area in dependence on the determined speed and direction.

17. The system of claim 13, wherein the sampling area comprises a buffer region surrounding the region of interest, and wherein a shape of the buffer region is based on a speed and a direction in which the second camera is traveling relative to the first region of interest.

18. The system of claim 13, wherein the one or more computing devices are further configured to: combine the high-resolution image of the first region of interest with one or more images captured by the first camera to form an enhanced full-frame image.

19. The method of claim 1, further comprising ranking the one or more regions of interest in dependence on one or more of a respective size, color, and contrast of each region of interest.

20. The method of claim 1, further comprising ranking the one or more regions of interest in dependence on actual or potential semantic content contained in each region of interest.

* * * * *